United States Patent
Choi et al.

(10) Patent No.: US 8,565,551 B2
(45) Date of Patent: Oct. 22, 2013

(54) APPARATUS AND METHOD OF REDUCING NOISE IN RANGE IMAGES

(75) Inventors: Kwang-Nam Choi, Seoul (KR); Jeong-Heon Kim, Gyeonggi-Do (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 493 days.

(21) Appl. No.: 12/844,229

(22) Filed: Jul. 27, 2010

(65) Prior Publication Data

US 2011/0103710 A1    May 5, 2011

(30) Foreign Application Priority Data

Nov. 3, 2009    (KR) .......................... 10-2009-0105563

(51) Int. Cl.
    *G06K 9/40*    (2006.01)
(52) U.S. Cl.
    USPC ............ 382/275; 382/260; 382/299; 382/312
(58) Field of Classification Search
    USPC .......................................... 382/275, 300, 171
    See application file for complete search history.

(56) References Cited

U.S. PATENT DOCUMENTS

| | | | |
|---|---|---|---|
| 6,339,758 B1 * | 1/2002 | Kanazawa et al. ............ | 704/226 |
| 7,702,174 B2 * | 4/2010 | Kato et al. .................... | 382/260 |
| 7,941,002 B2 * | 5/2011 | Samadani et al. ............. | 382/298 |
| 8,224,116 B2 * | 7/2012 | Hiraga et al. .................. | 382/275 |
| 8,275,219 B2 * | 9/2012 | Kameyama et al. ........... | 382/299 |
| 2006/0082665 A1 * | 4/2006 | Mizukura et al. .............. | 348/272 |
| 2009/0268982 A1 * | 10/2009 | Sakai ............................. | 382/275 |
| 2010/0166299 A1 * | 7/2010 | Nobori ........................... | 382/162 |

* cited by examiner

*Primary Examiner* — Vu Le
*Assistant Examiner* — Aklilu Woldemariam
(74) *Attorney, Agent, or Firm* — Ladas & Parry LLP

(57) ABSTRACT

An apparatus and method of reducing noise in range images, the apparatus including: a maximum likelihood detection unit calculating an equation of observation points disposed in a plurality of grids that constitute range images representing three-dimensional (3D) coordinate information, to satisfy maximum log-likelihood on each coordinate axis in a coordinate space represented by the range images based on probability distribution of coordinate values assigned to each of the observation points and neighboring observation points; a linearization unit transforming equations calculated on each of the observation points into a linear equation that is a linear system on each coordinate axis in a coordinate space; a constraint detection unit calculating a constraint equation in which a unit tangent vector of each observation point and a unit tangent vector of a neighboring point are identical with each other on each coordinate axis of the range images; and a noise reduction unit reducing noise in range images by applying a resultant value that is obtained by calculating a value of a linear equation represented in the form of least squares together with the constraint equation by using a normal equation on a position of each observation point in the range images. Noise in range images in which noise is not uniformly distributed, may be well reduced so that a smooth curved surface having stable curvature may be obtained.

18 Claims, 4 Drawing Sheets
(2 of 4 Drawing Sheet(s) Filed in Color)

(a)      (b)      (c)      (d)

(a)      (b)      (c)      (d)      (e)

APPARATUS AND METHOD OF REDUCING NOISE IN RANGE IMAGES

CROSS-REFERENCE TO RELATED PATENT APPLICATION

This application claims the benefit of Korean Patent Application No. 10-2009-0105563, filed on Nov. 3, 2009, in the Korean Intellectual Property Office, the disclosure of which is incorporated herein in its entirety by reference.

BACKGROUND OF THE INVENTION

1. Field of the Invention

The present invention relates to an apparatus and method of reducing noise in range images, and more particularly, to an apparatus and method of reducing noise in range images by which noise included in range images represented as three-dimensional (3D) coordinate information so that a curved surface can be smoothly represented.

2. Description of the Related Art

Image processing is a basic field in computer vision. Developments in image technologies provide an opportunity for acquiring images in various ways. Processing of three-dimensional (3D) information obtained from images has become an important issue in the field of visualization and vision. Owing to development of 3D sensing technologies, high resolution range images can be generated and thus, noise problem occurs continuously. In other words, a curved surface of interest needs to be extracted from image data including noise. As a result, the necessity for noise reduction methods in 3D image processing has increased.

Image noise reduction or smoothing is generally performed in image processing. Typically, methods of reducing noise in two-dimensional (2D) images are focused on a local value of a quantity field. Furthermore, in order to shape a smooth curved surface of a 3D object, the local geometric relationship is considered. Due to consideration of the local geometric relationship, the 3D object has a stable distribution having a characteristic based on the shape of a curved surface having the same curvature as a curvature of a curved surface of differential geometry.

Curvature is an excellent characteristic that is invariable to transformation for representing a curved surface. Such invariance is a good characteristic for computer vision such as object recognition, position or movement prediction, and image matching. Curvature represents the degree of steepness of a curve or a curved surface and is calculated from first-order and second-order partial differential equations in a 3D Euclid space. However, curvature is very sensitive to noise due to a characteristic based on such differential equations. A curved surface including noise obtained by a 3D image sensor represents non-uniform curvature in the entire region of an observed object. This indicates that most points of the curved surface are very steeply bent. In other words, the curved surface including noise causes curvature that is not uniform even in a flat surface and shows unexpected results. Thus, a steep point and a flat point of the curved surface are not classified. Curvature that is useful for classification is obtained from a smooth curved surface and thus, a method of smoothing the curved surface including noise is required.

Owing to development of vision technologies, outdoor mobile devices for obtaining range images have emerged and thus, range images can be obtained easily and rapidly every time everywhere. However, more and biased noise exists in range images. The magnitude and direction of noise is biased by mobile devices and thus, noise is distributed in different directions. For this reason, an observed curved surface is not uniform, and noise has an anisotropic distribution. A special smoothing method is required for application devices using an on-the-fly based device.

In curvature reconstruction using a radial basis function (RBF) that is generally performed, range data that is scattered when a RBF is obtained is convolved with a smoothing kernel, i.e., a low pass filter and is smoothed. Also, discrete approximation of the smoothing kernel enables an arbitrary filter kernel including an anisotropic and spatially variable filter. Smooth interpolation by moving least squares (MLS) approximation is also a powerful method. A mesh independent MLS-based projection method for general curved surface interpolation has been proposed. The mesh independent MLS-based projection method can be applied to $(d-1)$-dimensional manifold when $d \geq 2$, and thus, a curved surface is $C^\infty$ smooth. Meanwhile, image smoothing by diffusion is general, and a curved surface smoothing method using anisotropic diffusion of a level set curved surface model and a normal vector is better than isotropic diffusion that is performed as a low pass filter in noise reduction.

However, range images that are obtained by an on-the-fly-based 3D imaging device include more noise than general 3D images and have various noise levels in the same frame. Thus, the above-described methods are not appropriate to application on on-the-fly-based range images. Thus, smoothing by which noise in range images can be effectively reduced is required.

SUMMARY OF THE INVENTION

The present invention provides an apparatus and method of reducing noise in range images by which non-uniform curvature of range images that are obtained by a three-dimensional (3D) imaging sensor can be stabilized and a smooth curved surface can be obtained.

The present invention also provides a computer readable recording medium having recorded thereon a program for executing the method of reducing noise in range images.

According to an aspect of the present invention, there is provided an apparatus for reducing noise in range images, the apparatus including: a maximum likelihood detection unit calculating an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point; a linearization unit transforming equations calculated on each of the observation points into a linear equation that is a linear system on each coordinate axis in a coordinate space; a constraint detection unit calculating a constraint equation in which a unit tangent vector of each observation point and a unit tangent vector of a neighboring point are identical with each other on each coordinate axis of the range images; and a noise reduction unit reducing noise in range images by applying a resultant value that is obtained by calculating a value of a linear equation represented in the form of least squares together with the constraint equation by using a normal equation on a position of each observation point in the range images.

According to another aspect of the present invention, there is provided a method of reducing noise in range images, the method including: calculating an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point; transforming equations calculated on each of the observation points into a linear equation that is a linear system on each coordinate axis in a coordinate space; calculating a constraint equation in which a unit tangent vector of each observation point and a unit tangent vector of a neighboring point are identical with each other on each coordinate axis of the range images; and reducing noise in range images by applying a resultant value that is obtained by calculating a value of a linear equation represented in the form of least squares together with the constraint equation by using a normal equation on a position of each observation point in the range images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
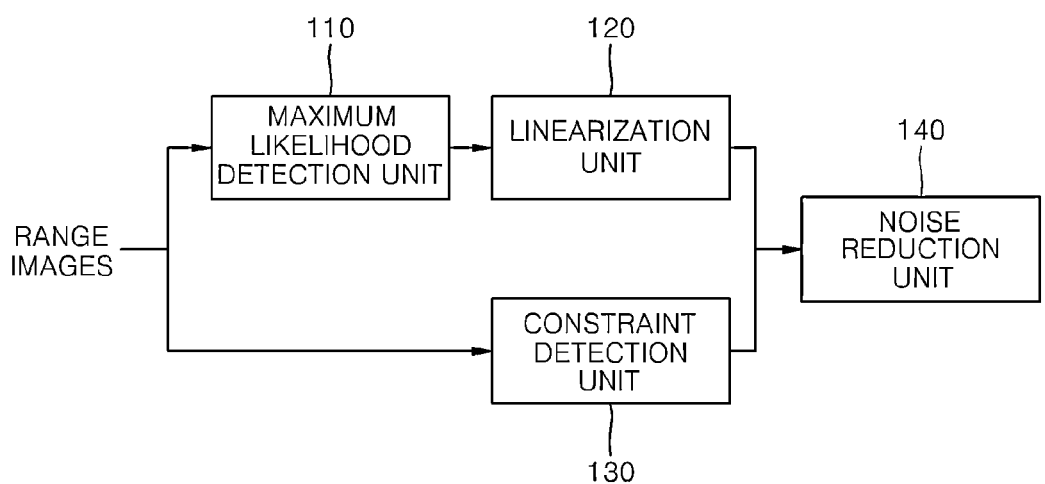
FIG. 1 is a block diagram of an apparatus for reducing noise in range images according to an embodiment of the present invention.

FIG. 1 is a block diagram of an apparatus for reducing noise in range images according to an embodiment of the present invention. Referring to FIG. 1, the apparatus for reducing noise in range images according to the present embodiment includes a maximum likelihood detection unit 110, a linearization unit 120, a constraint detection unit 130, and a noise reduction unit 140.

The maximum likelihood detection unit 110 calculates an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point.

A 3D imaging device, such as a stereo camera, a flash radar, and a structured light 3D scanner, generates range images rapidly by using an on-the-fly method. A range image is an image that represents 3D coordinate information of an object included in an image, i.e., position information at a distance from the 3D imaging device and position information in a 3D space and includes a plurality of grids. Each of observation points to which coordinate values are assigned is disposed in each of the grids that constitute the range image. Due to a characteristic of a device for generating range images, observation points are not disposed in all of the grids, and coordinate values that are measured on each portion of the object in real time are assigned to observation points disposed in a grid of a corresponding portion of the range image.

The maximum likelihood detection unit 110 calculates an equation for satisfying maximum log-likelihood on each of the observation points and each of coordinate axes in an actual coordinate space represented by the range images. In this case, each observation point is referred to as a random variance that is observed with Gaussian distribution on actual coordinates. A set including a central observation point $x_p$ that is one observation point sequentially selected from the observation points and neighboring observation points that are adjacent to the central observation point $x_p$ is defined as 'N', and it is assumed that coordinate values assigned to the observation points that belong to N have independent probability distribution. Thus, probability distribution in each coordinate axis at the central observation point $x_p$ is also independent. If the set N includes k observation points $x_1, \ldots, x_k$ including the central observation point $x_p$ and neighboring observation points, likelihood of the set N with respect to one coordinate axis in the coordinate space represented by the range image is expressed by using Equation 1:

$$p(N \mid \mu, \sigma^2) = \prod_{i=1}^{k} p(x_i \mid \mu_i, \sigma_i^2) \qquad (1)$$

$$= \prod_{i=1}^{k} \frac{1}{\sqrt{2\pi}\,\sigma_i} \exp\left[-\frac{(x_i - \mu_i)^2}{2\sigma_i^2}\right],$$

where $p(N|\mu,\sigma^2)$ is a likelihood of the set N, and $x_i$ is a coordinate value assigned to an i-th observation point, and $\mu_i$ is a coordinate value of the i-th observation point in an actual coordinate space, and $\sigma_i^2$ is a variance assigned to the i-th observation point and is derived from accuracy of the 3D imaging device. Also, the accuracy of the 3D imaging device may be obtained based on a specification in which detail operating environment of the 3D imaging device is described.

The observation points included in the set N include the central observation point $x_p$ and 8 neighboring observation points and may represent likelihood of observation points, totally k=9. Thus, the maximum likelihood detection unit 110 may estimate maximum likelihood from the set N including 9 observation points including corresponding observation points on each observation point disposed in the range images.

If an equation for estimating maximum log-likelihood is calculated from Equation 1, Equation 3 is obtained via Equation 2:

$$\sum_{i=1}^{k} -\frac{x_i - \mu_i}{\sigma_i^2} = 0 \quad (2)$$

$$\sum_{i=1}^{k} \frac{\mu_i}{\sigma_i^2} = \sum_{i=1}^{k} \frac{x_i}{\sigma_i^2}. \quad (3)$$

In other words, the maximum likelihood detection unit 110 calculates an equation as expressed by Equation 3 on an observation point disposed in each grid of the range images and on each coordinate axis in a coordinate space represented by the range images.

A coordinate value $\mu_i$ in the actual coordinate space in Equation 3 is an unknown value, and the accuracy of actual coordinates also corresponds to an unknown value. Thus, it is assumed that accuracy of a coordinate value $x_i$ assigned to an observation point is similar to accuracy of the coordinate value $\mu_i$, and the accuracy is defined as $3\sigma$. Thus, an unknown variable in Equation 1 is just the actual coordinate value $\mu_i$ in the coordinate space, and the following procedure is performed to obtain the unknown variable.

The linearization unit 120 transforms equations calculated on each observation point into a linear equation that is a linear system on each coordinate axis in a coordinate space.

Equation of maximum likelihood that is expressed by Equation 3 on k observation points including the central observation point $x_p$ and neighboring observation points sequentially selected from the range image is expressed as a linear algebra equation that is Equation 4 as below:

$$w^T \mu = w^T x, \quad (4)$$

where a vector $$w = \left( \frac{1}{\sigma_1^2}, \ldots, \frac{1}{\sigma_k^2} \right)^T.$$

Equation 4 is obtained from all of observation points disposed in the range images and from each coordinate axis in a coordinate space represented by the range images.

Next, if the size of the range image consists of one m (lengthwise)×n (widthwise) grid, Equation 4 that is obtained from each observation point may be expressed as Equation 5 that is expressed on k observation points disposed in one grid:

$$a^T \mu = a^T x, \quad (5)$$

where a vector $a = (a_1, \ldots, a_t)^T$. A factor $a_i$ of a vector a is determined as:

$$a_i = \begin{cases} \frac{1}{\sigma_i^2} & \text{if neighborhood of } x_p \\ 0 & \text{otherwise.} \end{cases}$$

In other words, a value of $$\frac{1}{\sigma_i^2}$$

is assigned to a factor corresponding to the k observation points, and values of the remaining factors are 0. Like Equation 4, Equation 5 is also obtained from all of observation points disposed in the range images and from each coordinate axis in a coordinate space represented by the range images.

Last, if the range images include totally s observation points, Equation 5 may be expressed as Equation 6 to include all of observation points:

$$A\mu = Ax, \quad (6)$$

where a matrix $A = (a_1, \ldots, a_s)^T$.

The linearization unit 120 calculates a linear equation expressed as Equation 6 on each coordinate axis in a coordinate space represented by the range images. The linear equation obtained from each coordinate axis includes all of observation points disposed in the range images. The range image is an image that represents a 3D coordinate space and thus, three linear equations expressed as Equation 6 are obtained. The linear equations are solved by a normal equation and are used to reduce noise in the range images.

The constraint detection unit 130 calculates a constraint equation in which a unit tangent vector of each observation point and a unit tangent vector of a neighboring point are identical with each other on each coordinate axis of the range images.

Curvature is calculated from a normal vector of a curved surface, and a unit tangent vector at a point on the curved surface corresponds to a factor for determining the normal vector of the curved surface. Thus, if a variation of unit tangent vectors on observation points disposed in the range images is minimized, a variation of curvature is minimized so that a smooth curved surface having stabilized curvature may be obtained. Hereinafter, an operation of calculating the constraint equation that makes unit tangent vectors in each coordinate axis direction of the range image uniform will be described.

In differential geometry, a curved surface is expressed by mapping an open set D in a two-dimensional (2D) Euclid space $R^2$ into a 3D Euclid space $R^3$ by using a coordinate patch $\mu : D \subset R^2 \to R^3$. In this case, D represents a set of observation points disposed in the range images. The coordinate path $\mu$ is expressed as a function of the set D, defined as Equation 7:

$$\mu(u,v) = (f_1(u,v), f_2(u,v), f_3(u,v)), \quad (7)$$

where $f_1(u,v)$, $f_2(u,v)$, and $f_3(u,v)$ are arbitrary functions, and u and v are coordinates corresponding to the x-axis and the y-axis in the range images, respectively.

A curve $\mu(u, v_0)$ at each point $(u_0, v_0)$ of the set D is referred to as a u-parameter curve at $v = v_0$ of $\mu$, and a curve $\mu(u_0, v)$ is referred to as a v-parameter curve at $u = u_0$ of $\mu$. In this case, a tangent vector $\mu_u$ of the u-parameter curve and a tangent vector $\mu_v$ of the v-parameter curve at $u_0$ and $v_0$ are obtained by partial differential equations in each direction. The partial differential equations of the range image are obtained by Equation 8:

$$\mu_u = \mu(u_0+1, v_0) - \mu(u_0, v_0)$$

$$\mu_v = \mu(u_0, v_0+1) - \mu(u_0, v_0) \quad (8).$$

Equation of u=direction tangent vector that is a constraint for smoothing is the following Equations 9 and 10:

$$\frac{\mu_u}{\|\mu_u\|} = \frac{\mu_{u+1}}{\|\mu_{u+1}\|} \quad (9)$$

$$\frac{\mu(u_0+1, v_0) - \mu(u_0, v_0)}{\|\mu_u\|} = \frac{\mu(u_0+2, v_0) - \mu(u_0+1, v_0)}{\|\mu_{u+1}\|}$$

-continued $$0 = \left(\frac{1}{\|\mu_u\|}\right)\mu(u_0, v_0) - \qquad (10)$$

$$\left(\frac{1}{\|\mu_u\|} + \frac{1}{\|\mu_{u+1}\|}\right)\mu(u_0+1, v_0) + \left(\frac{1}{\|\mu_{u+1}\|}\right)\mu(u_0+2, v_0).$$

If coordinate values $\|\mu_u\|$ and $\|\mu_{u+1}\|$ in the actual coordinate space are given, the coordinate values $\|\mu_u\|$ and $\|\mu_{u+1}\|$ may be formulated as linear combination related to $\mu$ and may be represented as a linear system on the entire range image by using the same manner as maximum log-likelihood estimation of point observation likelihood. However, since the coordinate values $\|\mu_u\|$ and $\|\mu_{u+1}\|$ are not known realistically, they are estimated from a coordinate value $\|\mu_u\|$ assigned to a corresponding observation point. Since a partial differential coefficient $x_u$ of noise data is very sensitively varied, $\mu_u$, to be obtained from a smooth curved surface may be not accurately estimated. Thus, $\|\mu_u\|$ on the entire range image is classified into two categories, i.e., a neighboring category and non-neighboring category. After that, $\|\mu_u\|$ is defined as a representative value of the categories of $\|\mu_u\|$.

Next, a linear equation in which tangent vectors in a v-direction are the same is summarized in the above manner. If two linear equations obtained in a u-direction and the v-direction are summed up, a constraint equation for making unit tangent vectors uniform is expressed by Equation 11:

$$\Gamma\mu=0, \qquad (11)$$

where $\mu$ is expressed in the form of a matrix including all of $\mu$-values that are obtained in the u-direction and the v-direction.

The noise reduction unit 140 reduces noise in range images by applying a resultant value that is obtained by calculating a value of a linear equation represented in the form of least squares together with the constraint equation by using a normal equation on a position of each observation point in the range images.

Normalization is a general technique for preventing overfitting and may make a curved surface including noise smooth. In this case, the constraint equation of Equation 11 is used. In the present invention, a Tikhonov normalization technique that is the most general and known normalization technique is used.

A value $\mu_\lambda$ of a linear system using Tikhonov normalization is defined as a value that is obtained by minimizing the weight sum of a residual norm and a side constraint. Thus, the noise reduction unit 140 represents the linear equation expressed as Equation 6 and the constraint equation expressed as Equation 11 in the form of normalization. This is expressed as Equation 12:

$$\mu_\lambda = \arg\min\{\|A\mu - Ax\|_2^2 + \lambda^2\|\Gamma\mu_2\|^2\}, \qquad (12)$$

where a normalization parameter $\lambda$ is used to control balance of minimization between the residual norm and the side constraint and is set to a value that is proportional to the degree of noise in the range images. In other words, the larger the amount of noise included in the range images is, the larger the value of $\lambda$ is. Thus, the degree of smoothing of an image increases.

The normalization equation expressed as Equation 12 is obtained from each coordinate axis in a coordinate space represented by the range image and may be expressed as an equivalent expression of Equation 13:

$$\mu_\lambda = \operatorname{argmin}\left\|\begin{bmatrix}A\\ \lambda I\end{bmatrix}\Gamma\mu - \begin{bmatrix}Ax\\ 0\end{bmatrix}\right\|^2, \qquad (13)$$

where a value of a least squares problem is obtained by solving the normalization equation, and the normalization equation is expressed as the following Equation 14:

$$(A-\lambda I)\begin{pmatrix}A\\ \lambda I\end{pmatrix}\Gamma\mu = (A-\lambda I)\begin{pmatrix}Ax\\ 0\end{pmatrix}. \qquad (14)$$

A value $\mu_\lambda$ of the normalization equation expressed as Equation 14 is applied on a coordinate value that has been already assigned to an observation point disposed in the range images.

As described above, the linear equation expressed as Equation 6 is obtained from each coordinate axis in a coordinate space and thus, three normalization equations expressed as Equation 14 are also obtained. Thus, three values $\mu_\lambda$ that are obtained by solving the normalization equation on each coordinate axis in a coordinate space are applied to coordinate values of all observation points. As such, new coordinate values are assigned to the observation points, and noise of the range images may be reduced, and a curved surface may be smoothly expressed.

As described above, in the present invention, the resultant value for adaptively reducing noise is assigned to each observation point so that, even when the degree of noise included in the range images is various, an excellent performance of reducing noise may be exhibited.

Figure 2:
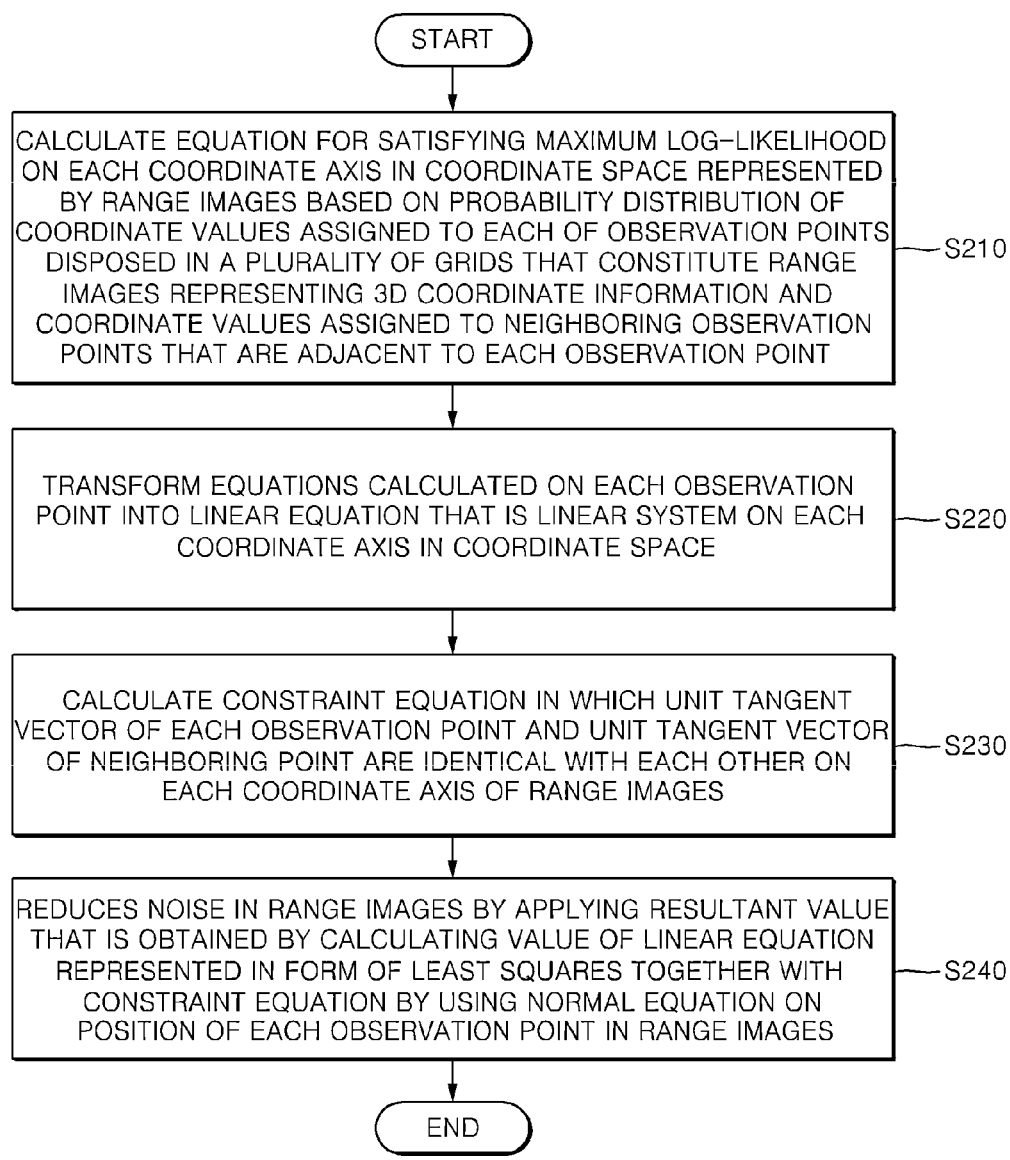
FIG. 2 is a flowchart illustrating a method of reducing noise in range images according to an embodiment of the present invention.

FIG. 2 is a flowchart illustrating a method of reducing noise in range images according to an embodiment of the present invention. Referring to FIG. 2, in Operation S210, the maximum likelihood detection unit 110 calculates an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point. Next, in Operation S220, the linearization unit 120 transforms equations calculated on each observation point into a linear equation that is a linear system on each coordinate axis in a coordinate space and obtains the equation expressed as Equation 6. The linear equation of Equation 6 is obtained to correspond to each coordinate axis in a coordinate space and includes equations of all observation points disposed in the range images.

In Operation S230, the constraint detection unit 130 calculates a constraint equation in which a unit tangent vector of each observation point and a unit tangent vector of a neighboring point are identical with each other on each coordinate axis of the range images. The constraint equation is calculated from the equation of a tangent vector that is obtained by a partial differential equation in the direction of each coordinate axis of the range images, like Equation 11. Last, in Operation S240, the noise reduction unit 140 reduces noise in range images by applying a resultant value that is obtained by calculating a value of a linear equation represented in the form of least squares together with the constraint equation by using a normal equation on a position of each observation point in the range images. The resultant value that is obtained from the normalization equation of Equation 14 is applied to a coordinate value assigned to each observation point so that new coordinate values may be assigned to the observation points and noise in the range images may be reduced and a smooth curved surface may be obtained.

Figure 3A:
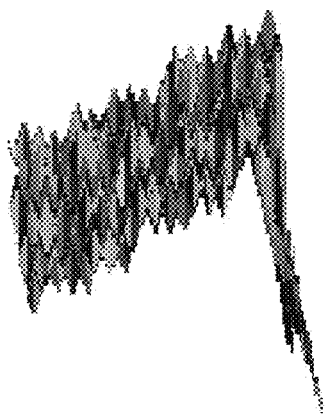
FIGS. 3A through 3C are images that are obtained by comparing the result of applying a Gaussian filter on range images including noise with the result of applying the present invention on the range images including noise.
Figure 3B:
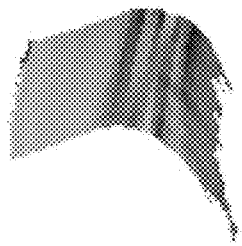
Figure 3C:
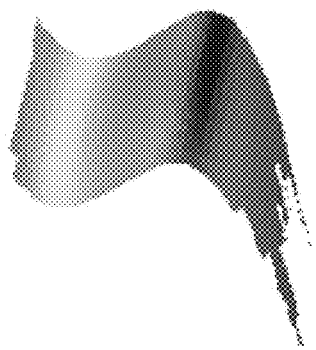

FIGS. 3A through 3C are images that are obtained by comparing the result of applying a Gaussian filter on range images including noise with the result of applying the present invention on the range images including noise. FIG. 3A is an image that is obtained by enlarging part of range images obtained by a stereo camera and a value of average curvature is represented by color. A curved surface of the image of FIG. 3A shows a large variation in curvature and includes more noise. FIG. 3B is an image that is obtained by applying a Gaussian filter to the image of FIG. 3A. A large part of noise included in the image of FIG. 3A is removed, but a curved surface is not smooth and thus unstable curvature is shown, and part of the curved surface is omitted. On the other hand, FIG. 3C is an image that is obtained by applying the present invention to the image of FIG. 3A, and stable curvature is shown in all portions of the curved surface without an omitted portion of the curved surface. An unbent portion of the curved surface is expressed flat, and a bent portion of the curved surface is gently smoothed, and thus a performance of reducing noise of the present invention is excellent.

Experiments for reducing noise in range images were conducted using the above-described moving least squares (MLS). MLS is generally used to reduce noise in images obtained by a laser scanner, and in MLS, noise reduction is performed only in a region having a low signal to noise ratio. Thus, MLS is not appropriate to images including more noise. MLS uses a Gaussian function $e^{-d^2/h^2}$ on a distance d, and h is a parameter indicative of an expected distance between neighboring observation points.

Figure 4:
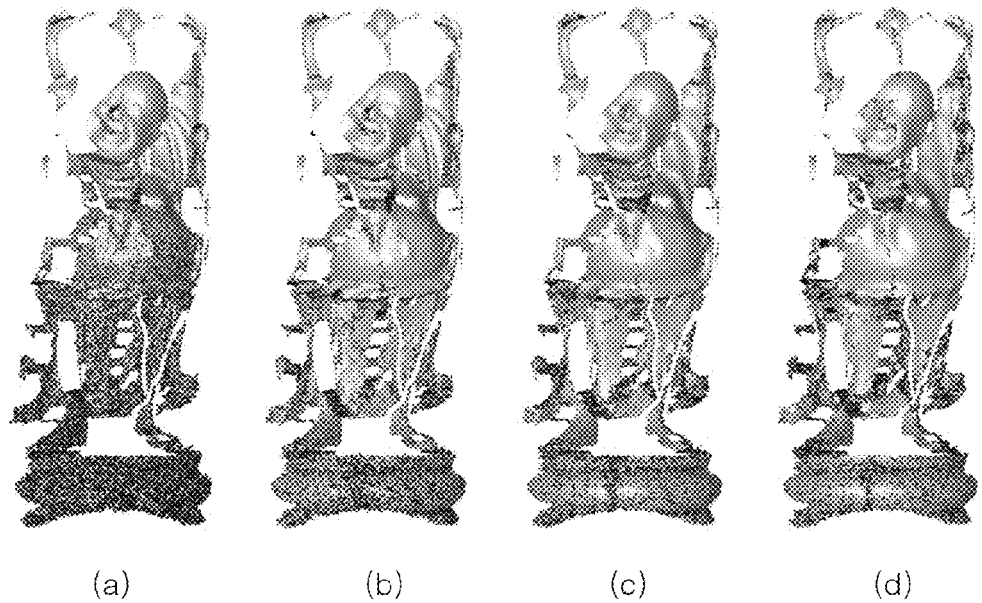
FIG. 4 is images that are obtained by using moving least squares (MLS) in range images according to a parameter variable.

FIG. 4 is images that are obtained by using moving least squares (MLS) in range images according to a parameter variable. (a) of FIG. 4 is an original range image showing various signal to noise ratios in the entire image, and (b) of FIG. 4 is an image that is obtained when h=0.003, and (c) of FIG. 4 is an image that is obtained when h=0.004, and (d) of FIG. 4 is an image that is obtained when h=0.006. Referring to (b) of FIG. 4, noise is well removed in an upper portion of the image in which relatively small noise is included, and noise is not properly removed in a lower portion of the image in which many noise is included. Also, referring to (c) and (d) of FIG. 4, as the value of h increases, noise of the image in which many noise is included, is slightly reduced, but noise of the image in relatively small noise is included, is excessively smoothed, and an object included in the image loses its original shape. Thus, conventional MLS is not appropriate to the range images including various signal to noise ratios.

Figure 5:
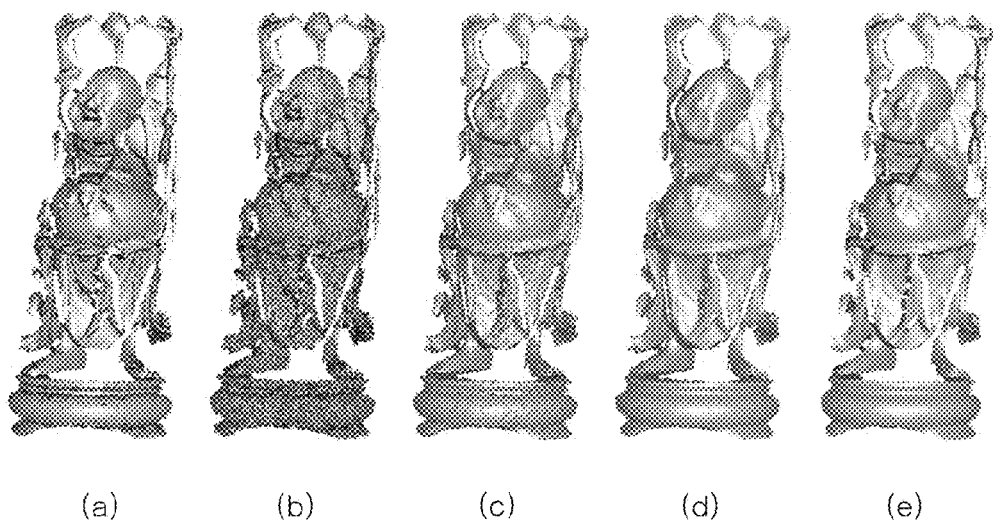
FIG. 5 is images that are obtained by applying Gaussian filtering on range images including added Gaussian noise and by applying the present invention on the range images including added Gaussian noise, respectively.

FIG. 5 is images that are obtained by applying Gaussian filtering on range images including added Gaussian noise and by applying the present invention on the range images including added Gaussian noise, respectively. (a) of FIG. 5 is an original range image having no noise, and (b) of FIG. 5 is a range image to which Gaussian noise is added. The value of curvature in each portion of the range image is represented by color. Gaussian noise has been added by dispersion that increases according to the Y-axis of the range image and is used to clearly check the performance of reducing noise of the present invention. Gaussian filtering performed to reduce noise in range images is applied repeatedly with a standard deviation of 0.5 with a window having the size of 3×3. (c) of FIG. 5 is a resultant image on which Gaussian filtering is repeatedly applied ten times, and (d) of FIG. 5 is a resultant image on which Gaussian filter is repeatedly applied twenty times. Referring to (c) of FIG. 5, noise in an upper portion of the range image in which relatively small noise is included, is well reduced, but noise in a lower portion of the range image in which many noise is included, still remains. On the other hand, referring to (d) of FIG. 5, as the number of application of Gaussian filtering increases, noise is not well reduced in the lower portion of the rang image in which many noise is included, but smoothing is excessively performed in the upper portion of the range image in which relatively small noise is included. (e) of FIG. 5 is a resultant image from which noise is reduced by applying the present invention, and smoothing is well performed in all portions of the range image.

Also, an apparatus for reducing noise in range images according to the present invention may be disposed in a 3D imaging device for generating range images. As described above, the 3D imaging device generates range images at a high speed, whereas many noise is included in the generated rang images. However, as the apparatus for reducing noise in range images according to the present invention is disposed in the 3D imaging device, noise is reduced in real-time immediately after the range images are generated, so that the performance of the 3D imaging device may also be improved.

As described above, in an apparatus and method of reducing noise in range images according to the present invention, a value of a normalization equation that is adaptively applied to each of observation points disposed in range images having a grid shape is calculated from an equation of maximum log-likelihood and a constraint equation for making unit tangent vectors uniform so that noise in range images in which noise is not uniformly distributed, may be well reduced and a smooth curved surface having stable curvature may be obtained. Also, the apparatus of reducing noise in range images may be disposed in a 3D imaging device so that the performance of the 3D imaging device may be improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for reducing noise in range images, the apparatus comprising:
a maximum likelihood detection unit calculating an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point;

a linearization unit transforming equations calculated on each of the observation points into a linear equation that is a linear system on each coordinate axis in a coordinate space;

a constraint detection unit calculating a constraint equation in which a unit tangent vector of each observation point and a unit tangent vector of a neighboring point are identical with each other on each coordinate axis of the range images, wherein the constraint detection unit calculates the constraint equation from an equation of a tangent vector that is obtained by a partial differential equation in a direction of each coordinate axis of the range images; and a noise reduction unit reducing noise in range images by applying a resultant value that is obtained by calculating a value of a linear equation represented in the form of least squares together with the constraint equation by using a normal equation on a position of each observation point in the range images.

2. The apparatus of claim 1, wherein the maximum likelihood detection unit calculates an equation of a central observation point based on probability distribution of coordinate values assigned to the central observation point sequentially selected from the observation points and neighboring observation points that are adjacent to the central observation point.

3. The apparatus of claim 2, wherein the maximum likelihood detection unit calculates an equation represented by the following equation on each coordinate axis in the coordinate space:

$$\sum_{i=1}^{k} \frac{\mu_i}{\sigma_i^2} = \sum_{i=1}^{k} \frac{x_i}{\sigma_i^2},$$

where k is a total number of the central observation point and the neighboring observation points, and $\mu_i$ is a coordinate value of an i-th observation point in the coordinate space among the k observation points, and coordinate space, and $x_i$ is a coordinate value assigned to an i-th observation point, and $\sigma_i^2$ is a variance derived from accuracy of an imaging device for generating the range images.

4. The apparatus of claim 2, wherein the constraint detection unit calculates the constraint equation from an equation of a tangent vector that is obtained by a partial differential equation in a direction of each coordinate axis of the range images.

5. The apparatus of claim 3, wherein the constraint detection unit calculates the constraint equation from an equation of a tangent vector that is obtained by a partial differential equation in a direction of each coordinate axis of the range images.

6. The apparatus of claim 1, wherein the noise reduction unit calculates the resultant value by representing the linear equation and the constraint equation in a form of Tikhonov normalization.

7. The apparatus of claim 2, wherein the noise reduction unit calculates the resultant value by representing the linear equation and the constraint equation in a form of Tikhonov normalization.

8. The apparatus of claim 3, wherein the noise reduction unit calculates the resultant value by representing the linear equation and the constraint equation in a form of Tikhonov normalization.

9. A method of reducing noise in range images, the method comprising:

calculating an equation for satisfying maximum log-likelihood on each coordinate axis in a coordinate space represented by the range images based on probability distribution of coordinate values assigned to each of observation points disposed in a plurality of grids that constitute range images representing three-dimensional (3D) coordinate information and coordinate values assigned to neighboring observation points that are adjacent to each observation point;

transforming equations calculated on each of the observation points into a linear equation that is a linear system on each coordinate axis in a coordinate space;

calculating a constraint equation in which a unit tangent vector of each observation point and a unit tangent vector of a neighboring point are identical with each other on each coordinate axis of the range images, wherein the constraint equation is calculated from an equation of a tangent vector that is obtained by a partial differential equation in a direction of each coordinate axis of the range images; and reducing noise in range images by applying a resultant value that is obtained by calculating a value of a linear equation represented in the form of least squares together with the constraint equation by using a normal equation on a position of each observation point in the range images.

10. The method of claim 9, wherein the calculating of the equation of the observation points comprises calculating an equation of a central observation point based on probability distribution of coordinate values assigned to the central observation point sequentially selected from the observation points and neighboring observation points that are adjacent to the central observation point.

11. The method of claim 10, wherein the calculating of the equation of the observation points comprises calculating an equation represented by the following equation on each coordinate axis in the coordinate space:

$$\sum_{i=1}^{k} \frac{\mu_i}{\sigma_i^2} = \sum_{i=1}^{k} \frac{x_i}{\sigma_i^2},$$

where k is a total number of the central observation point and the neighboring observation points, and $\mu_i$ is a coordinate value of an i-th observation point in the coordinate space among the k observation points, and coordinate space, and $x_i$ is a coordinate value assigned to an i-th observation point, and $\sigma_i^2$ is a variance derived from accuracy of an imaging device for generating the range images.

12. The method of claim 9, wherein the calculating of the constraint equation comprises calculating the constraint equation from an equation of a tangent vector that is obtained by a partial differential equation in a direction of each coordinate axis of the range images.

13. The method of claim 10, wherein the calculating of the constraint equation comprises calculating the constraint equation from an equation of a tangent vector that is obtained by a partial differential equation in a direction of each coordinate axis of the range images.

14. The method of claim 11, wherein the calculating of the constraint equation comprises calculating the constraint equation from an equation of a tangent vector that is obtained by a partial differential equation in a direction of each coordinate axis of the range images.

15. The method of claim 9, wherein the reducing of noise comprises calculating the resultant value by representing the linear equation and the constraint equation in a form of Tikhonov normalization.

16. The method of claim 10, wherein the reducing of noise comprises calculating the resultant value by representing the linear equation and the constraint equation in a form of Tikhonov normalization.

17. The method of claim 11, wherein the reducing of noise comprises calculating the resultant value by representing the linear equation and the constraint equation in a form of Tikhonov normalization.

18. A non-transitory computer-readable recording medium having a program recorded thereon for executing the method according to claim 9 on a computer.

* * * * *